United States Patent
Peskens

(10) Patent No.: US 10,072,163 B2
(45) Date of Patent: Sep. 11, 2018

(54) INTUMESCENT COATING COMPOSITION

(71) Applicant: PPG Coatings Europe BV, Amsterdam (NL)

(72) Inventor: Ronnie Peskens, Allison Park, PA (US)

(73) Assignee: PPG Coatings Europe BV, Amsterdam (NL)

( * ) Notice: Subject to any disclaimer, the term of this patent is extended or adjusted under 35 U.S.C. 154(b) by 327 days.

(21) Appl. No.: 14/647,007

(22) PCT Filed: Nov. 25, 2013

(86) PCT No.: PCT/EP2013/074543
§ 371 (c)(1),
(2) Date: May 22, 2015

(87) PCT Pub. No.: WO2014/080000
PCT Pub. Date: May 30, 2014

(65) Prior Publication Data
US 2015/0291810 A1  Oct. 15, 2015

(30) Foreign Application Priority Data
Nov. 23, 2012  (EP) .................................... 12194124

(51) Int. Cl.
C09D 5/18 (2006.01)
C09K 21/10 (2006.01)
C09K 21/14 (2006.01)

(52) U.S. Cl.
CPC .............. *C09D 5/185* (2013.01); *C09K 21/10* (2013.01); *C09K 21/14* (2013.01)

(58) Field of Classification Search
CPC ......... C09D 5/185; C09K 21/10; C09K 21/14
See application file for complete search history.

(56) References Cited

U.S. PATENT DOCUMENTS

2004/0035318 A1    2/2004  Gang

OTHER PUBLICATIONS

Horack, Heinrich; "Reactions of Stoichiometric Intumescent Paints"; Journal of Applied Polymer Science; Apr. 17, 2009; pp. 1745-1756; vol. 113; Wiley Periodicals, Inc.

*Primary Examiner* — Patrick D Niland

(57) ABSTRACT

An intumescent coating composition and a coated metal substrate are described. The composition comprises: (a) a polymeric binder; (b) an acid catalyst effective to form a polyphosphoric acid on thermal decomposition; (c) a solid carbon donor; (d) a liquid carbon donor in the form of one or more polyhydric alcohols effective to form a phosphoric acid ester on contact with phosphoric acid; (e) an expansion agent; (f) one or more pigments; (g) optionally, one or more other additives; (h) a liquid carrier for the polymeric binder The ratio of combined components (b), (c), (e) and (f):(a) is at least 4:1 w/w. A coating composition wherein the concentration of components (b), (e) and (f) is in the range 55-75% w/w solids is further described.

30 Claims, 1 Drawing Sheet

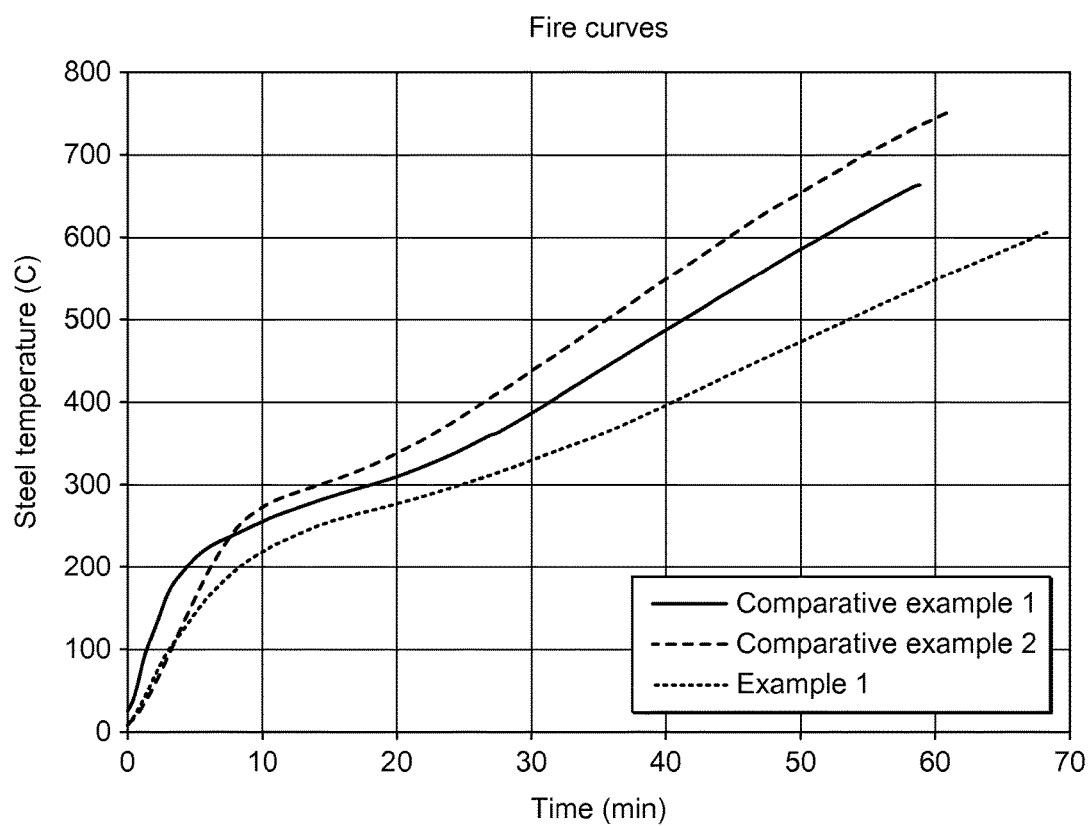

INTUMESCENT COATING COMPOSITION

The present invention relates to an intumescent coating composition, and a coating and coated substrates derived therefrom, in particular, an intumescent coating with improved fire performance.

Intumescent coatings are fire retardant coatings which produce gases upon heating. The coating decomposes to form a char which is then expanded into foam by the release of gases. The trapped gases within the foam form the char into an insulating layer of carbon which protects the underlying substrate. Intumescent coatings are applied to surfaces which require improved fire resistance. They are commonly used in the construction industry to give improved fire resistance to building materials by reducing the rate of heating and hence prolonging the time for the building materials to reach critical failure temperature.

An intumescent coating may be water or solvent based or solvent free, and includes a polymeric binder for the intumescent components. Generally, intumescent coatings have, in addition to the binder, a source of phosphoric acid, an expansion agent or blowing agent and a carbon source.

The carbon source is typically a solid carbon source such as pentaerythritol (PER) or a derivative thereof. It is understood that the solid carbon source such as pentaerythritol will be dehydrated as well as form esters with the phosphor of the polyphosphoric acid source (usually ammonium polyphosphate (APP)) prior to decomposition into a foaming carbonaceous char. Horacek et al. (Journal of AppliedPolymer Science, Vol. 113, 1745-1756 (2009)) have found that glycerine (GLY) may be used as a liquid carbon source in addition to pentaerythritol in intumescent coatings. The low molecular weight esters that are formed from the reaction between polyphosphoric acid and glycerine have low temperatures of decomposition, possibly enhancing the fire retardant time by faster char formation. However, the use of glycerine is problematic and does not necessarily result in enhanced fire retardant properties.

Surprisingly, it has now been discovered that the fire retardant properties of intumescent coatings can be enhanced by use of both a liquid carbon donor and by restoring the pigment volume concentration (PVC) to that in the region of an equivalent solid carbon donor system.

According to a first aspect of the present invention there is provided an intumescent coating composition comprising:—
(a) a polymeric binder;
(b) an acid catalyst effective to form a phosphoric acid, preferably, a polyphosphoric acid on thermal decomposition;
(c) a solid carbon donor;
(d) a liquid carbon donor in the form of one or more polyhydric alcohols effective to form a phosphoric acid ester on contact with phosphoric acid wherein the phosphoric acid ester has a lower temperature of decomposition than the equivalent pentaerythritol phosphoric acid ester;
(e) an expansion agent, preferably one which decomposes at temperatures >200° C.;
(f) one or more pigments;
(g) optionally, one or more other additives;
(h) a liquid carrier for the polymeric binder wherein the liquid carrier may be water or an organic solvent and when the liquid carrier is water the binder and liquid carrier are in the form of an aqueous polymeric dispersion; and wherein the ratio of combined components (b), (c), (e) and (f):(a) is at least 4:1 w/w.

Preferably, the ratio of combined components (b), (c), (e) and (f):(a) is between 4:1 and 8:1 w/w in the composition, more preferably, between 4:1 and 5:1 w/w.

Preferably, the ratio of (b):(c) is at least 3:1 w/w.
Preferably, the ratio of (e):(c) is at least 3:2 w/w.
Preferably, the ratio of (f):(c) is at least 2:1 w/w.

The level of components (b), (e) and (f) relative to component (d) is also important and it is found best results are achieved when the ratio of (b):(d) is preferably at least 6:1 w/w; the ratio of (e):(d) is typically, at least 3:2 w/w; and the ratio of (f) (d) is typically, at least 2:1 w/w.

Preferably, the concentration of components (b), (e) and (f) in the coating composition is in the range 45-75% w/w solids, more preferably, 50-70% w/w solids. By maintaining the non-carbon donor solids, components (b), (e) and (f), at high levels in a liquid carbon donor containing composition, the pigment volume concentration is maintained to the level of an equivalent solid carbon donor composition and a surprising improvement in fire resistance is observed. For the avoidance of doubt liquid carbon donor is included as a solid for this purpose because it is present in the dry coating.

Accordingly, according to a further aspect of the invention there is provided an intumescent coating composition comprising:—
(a) a polymeric binder;
(b) an acid catalyst effective to form a phosphoric acid, preferably, a polyphosphoric acid on thermal decomposition;
(c) a solid carbon donor;
(d) a liquid carbon donor in the form of one or more polyhydric alcohols effective to form a phosphoric acid ester on contact with phosphoric acid wherein the phosphoric acid ester has a lower temperature of decomposition than the equivalent pentaerythritol phosphoric acid ester;
(e) an expansion agent, preferably one which decomposes at temperatures >200° C.;
(f) one or more pigments;
(g) optionally, one or more other additives;
(h) a liquid carrier for the polymeric binder wherein the liquid carrier may be water or an organic solvent and when the liquid carrier is water the binder and liquid carrier are in the form of an aqueous polymeric dispersion; and wherein the concentration of components (b), (e) and (f) in the coating composition is in the range 55-75% w/w solids.

Preferably, according to any aspect of the invention, the solid carbon donor (c) may be present in the coating composition in the range 10-80% w/w total carbon donor i.e. total liquid (d) and solid carbon donor (c), more preferably, 15-50% w/w, most preferably, 20-50%, especially, 30-40% w/w. Accordingly, the liquid carbon donor may be present in the composition in the range 90-20% w/w total carbon donor (c) & (d), more preferably, 85-50% w/w, most preferably, 70-60% w/w.

Preferably, the concentration of components (b), (c) (e) and (f) in the composition is in the range 50-80% w/w solids, more preferably, 50-70% w/w solids, most preferably, 60-70% w/w solids.

By liquid in liquid carbon donor is meant that the carbon donor is a liquid at 25° C. and atmospheric pressure.

Preferably, the liquid carbon donor is glycerine.

According to a further aspect of the present invention there is provided a dry coating composition coated onto a surface comprising:—
(a) a polymeric binder derived from either an aqueous polymeric dispersion of the binder or an organic solvent based solution of the binder;

(b) an acid catalyst effective to form a phosphoric acid, preferably, a polyphosphoric acid on thermal decomposition;
(c) a solid carbon donor;
(d) a liquid carbon donor in the form of one or more polyhydric alcohols effective to form a phosphoric acid ester on contact with phosphoric acid wherein the phosphoric acid ester has a lower temperature of decomposition than the equivalent pentaerythritol phosphoric acid ester;
(e) an expansion agent, preferably one which decomposes at temperatures >200° C.;
(f) one or more pigments; and
(g) optionally, one or more other additives;
wherein the ratio of combined components (b), (c), (e) and (f):(a) is at least 4:1 w/w According to a further aspect of the present invention there is provided a coated metal substrate wherein the coating comprising:—
(a) a polymeric binder;
(b) an acid catalyst effective to form a phosphoric acid, preferably, a polyphosphoric acid on thermal decomposition;
(c) a solid carbon donor;
(d) a liquid carbon donor in the form of one or more polyhydric alcohols effective to form a phosphoric acid ester on contact with phosphoric acid wherein the phosphoric acid ester has a lower temperature of decomposition than the equivalent pentaerythritol phosphoric acid ester;
(e) an expansion agent, preferably one which decomposes at temperatures >200° C.;
(f) one or more pigments; and
(g) optionally, one or more other additives;
wherein the ratio of combined components (b), (c), (e) and (f):(a) is at least 4:1 w/w The polymeric binders of the present invention are generally film forming binders known to those skilled in the art of intumescent coatings. Although, the compositions of the present invention may be used to coat any substrate they are generally to be applied to metal substrates such as steelwork either directly or indirectly via primer and/or intermediate layers. Generally, after curing the water dispersed polymeric binder is no longer soluble in water. The polymeric binder may be a (co)polymer derived from (co)monomers including vinyl acetate, vinyl acetate-ethylene, or vinyl acetate-VeoVa. Other possible (co)monomers may be selected from acrylic-styrene, acrylic-vinyl toluene, styrene-butadiene, vinyl toluene-butadiene, styrene-acrylonitrile, vinyl toluene-acrylonitrile, diisocyanate-polyol, vinyl alcohol, vinyl acetate, vinyl butyral, urea-formaldehyde, melamine-formaldehyde, alkyl phenol-formaldehyde, vinyl chloride-vinylidene chloride, or is derived from epoxy resins and amino-functional curing agents, or is derived from a dicarboxylic acid and a polyol and fatty acid modifiers.

By acrylic monomer herein is meant any suitable alkyl (alk)acrylate or (alk)acrylic acid such as methyl methacrylate, ethyl methacrylate, methyl acrylate, ethyl acrylate, methacrylic acid or acrylic acid, n-butyl acrylate, iso-butyl acrylate, t-butyl acrylate, n-butyl methacrylate, iso-butyl methacrylate, t-butyl methacrylate, 2-ethylhexyl methacrylate, 2-ethylhexyl acrylate, lauryl methacrylate, lauryl acrylate, cyclohexyl acrylate, cyclohexyl methacrylate, isobornyl acrylate, isobornyl methacrylate; hydroxyl-functional acrylates such as 2-hydroxyethyl methacrylate, hydroxypropylethyl methacrylate, 2-hydroxyethyl acrylate, or hydroxypropyl acrylate; and mixtures thereof.

As referred to above, the liquid carrier may be water or an organic solvent. The binder is generally in an aqueous polymeric dispersion, although solvent based systems are also envisaged. The solvent based systems may comprise sole solvent or solvent blends. A suitable solvent is xylene. A suitable solvent blend is toluene/methylketone blend. Preferably, the binder is present at 5-40% w/w solids, more preferably, 10-35% w/w solids, most preferably, 10-20% w/w solids.

Suitable solid carbon donors may be selected from organic polyhydroxy compounds. Suitable compounds may be selected from pentaerythritol, dipentaerythritol, tripentaerythritol, starch, sugars. Preferably, the solid carbon donor is pentaerythritol.

The expansion agent is typically effective to form a foam by emission of an inert gas. Suitable expansion agents are those which decompose/are activated above 200° C., for example in the range 280 to 390° C. Suitable expansion agents are generally nitrogen containing compounds such as melamine, melamine salts, melamine derivatives, urea, dicyandiamide and guanidine. Preferably, the expansion agent is melamine.

Suitably, the acid catalyst is one that thermal decomposes upon exposure to extreme heat such as that found in a fire, for example above 200° C. It will be appreciated that the phosphoric acid formed under such conditions from component (b) is then available to react with the liquid carbon donor of component (d) which is suitably one that forms a phosphoric acid ester upon contact therewith at such temperatures. Suitably, the solid carbon donor (c) is also effective to react with the phosphoric acid to form a phosphoric acid ester upon contact therewith at such temperatures.

Suitable acid catalysts (b) include phosphoric acid esters of polyhydroxy compounds (partial phosphate esters) and aminophophates such as ammonium phosphate or amine phosphates. Particularly preferred phosphates are the aminophosphates ammonium polyphosphate (APP) and melamine phosphate. However, the skilled person will be aware of many variations of the nitrogen containing acidic phosphorous compounds which are used in the art of intumescent coatings. Preferably, the acid catalyst (b) is APP. The catalyst typically forms polyphosphoric acids on thermal decomposition and these are preferred but it is also possible in some embodiments for a monophosphoric acid to be formed.

Suitable pigments for the composition are those know to the skilled person in the intumescent coatings art such as $TiO_2$ and carbon black, preferably $TiO_2$ is used.

Suitable additives may include:— plasticisers, de-foamers, cellulose thix agents, acrylic thix agents, biocides etc.

Advantageously, the present inventors have found that the compositions of the invention provide several unexpected advantages:—
the length of fire protection is improved;
the speed of intumescent action increases as the temperature of char formation is lowered;
the liquid carbon donor encapsulates the pigments in the present coating such that the char formed consists of small homogenous air chambers making the char denser and more effective at insulating the substrate;
the char layer formed by the present invention has greater integrity and flexibility reducing the level of cracking observed;
the increase in solids levels that the use of a liquid carbon donor allows by reducing viscosity means a lower volume of solvent is required hence providing increased solids and reducing drying times;
the liquid carbon donor acts as a plasticizer within the present coating and prevents an increase in viscosity or gelling of the coating that is typically observed when intumescent coatings are stored, thereby increasing the shelf life of the present coating up to 12 months;

It is also observed that the liquid carbon donor and high pigment volume concentration act together to decrease the drying time of the coating by up to 50% compared with coatings comprising only liquid carbon donors.

The invention will now be described by way of example only with reference to the accompanying FIGURES and examples in which:—

FIG. 1 is a fire curve for an example of the invention and two comparative examples.

EXAMPLES

An intumescent coating (Comparative example 1) was studied with glycerine added as a carbon source (Comparative example 2). Fire performance did not significantly improve with the addition of glycerine as replacement for pentaerythritol (PER). However, with the restoration of the original solids content of the formulation (Example 1) significant improvements in fire performance were observed.

Comparative Example 1: Standard Formulation

| Raw Material | Weight percentage (%) |
|---|---|
| Vinyl acetate/VeoVa10 copolymer dispersion (50% solids by weight) | 21.57 |
| Water | 18.47 |
| Cellulose thickener | 0.26 |
| Sodium salt of carboxylate polyelectrolyte | 0.21 |
| Defoamer | 0.20 |
| Biocide | 0.07 |
| Coalescent | 1.79 |
| Acrylic copolymer emulsion (rheology additive) | 0.92 |
| Titanium Dioxide | 9.98 |
| Pentaerythritol | 9.31 |
| Ammonium PolyPhosphate | 27.93 |
| Melamine | 9.31 |

APP/TiO$_2$/MEL solids≈47

Comparative Example 2: Standard Formulation with PER Replaced by Glycerine (on OH Content)

| Raw Material | Weight percentage (%) |
|---|---|
| Vinyl acetate/VeoVa10 copolymer dispersion (50% solids by weight) | 21.78 |
| Water | 18.66 |
| Cellulose thickener | 0.26 |
| Sodium salt of carboxylate polyelectrolyte | 0.21 |
| Defoamer | 0.20 |
| Biocide | 0.07 |
| Coalescent | 1.81 |
| Acrylic copolymer emulsion (rheology additive) | 0.92 |
| Titanium Dioxide | 10.08 |
| Glycerine | 8.40 |
| Ammonium PolyPhosphate | 28.21 |
| Melamine | 9.40 |

APP/TiO$_2$/MEL solids≈48

Example 1

| Raw Material | Weight percentage (%) |
|---|---|
| Vinyl acetate/VeoVa10 copolymer dispersion (50% solids by weight) | 14.10 |
| Water | 12.08 |
| Cellulose thickener | 0.17 |
| Sodium salt of carboxylate polyelectrolyte | 0.13 |
| Defoamer | 0.13 |
| Biocide | 0.05 |
| Coalescent | 1.17 |
| Acrylic copolymer emulsion (rheology additive) | 0.60 |
| Glycerine | 5.68 |
| Titanium Dioxide | 13.29 |
| Pentaerythritol | 3.01 |
| Ammonium PolyPhosphate | 37.20 |
| Melamine | 12.40 |

APP/TiO$_2$/MEL solids≈63

Experimental

Synthetic glycerine was used to prepare the modified coating by exchanging the OH content of PER with GLY.

The substrate in each case was an A/V 140, SA 2½ grit blasted steel T-bar of 11 kg. The coating was applied by first applying a zinc phosphate epoxy primer using a conventional air spray and then applying the intumescent paint also using a conventional spray. The coated substrates were cured for one week at room temperature and one further week at 40° C. after application of the intumescent coat.

The fire test was carried out up to 620° C. steel temperature according to EN13381-4.

As can be seen from comparative examples 1 and 2 when compared with example 1, when PVC was brought back to standard level by filling out with the original pigment mix, the fire performance drastically improved by 10-30%.

This is shown in FIG. 1 where it can be seen that the temperature of the substrate is lower for a longer period for the examples of the invention.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. An intumescent coating composition comprising:
   (a) a polymeric binder;
   (b) an acid catalyst effective to form a phosphoric acid,
   (c) a solid carbon donor;
   (d) a liquid carbon donor in the form of one or more polyhydric alcohols effective to form a phosphoric acid ester on contact with phosphoric acid wherein the phosphoric acid ester has a lower temperature of decomposition than the equivalent pentaerythritol phosphoric acid ester;
   (e) an expansion agent;
   (f) one or more pigments;
   (g) optionally, one or more other additives; and
   (h) a liquid carrier for the polymeric binder, wherein the liquid carrier comprises water or an organic solvent, and when the liquid carrier comprises water the binder and liquid carrier are in the form of an aqueous polymeric dispersion,
   wherein the ratio of combined components (b), (c), (e) and (f):(a) is 4:1 w/w to 8:1 w/w, and
   wherein the ratio of (b):(d) is at least 6:1 w/w.

2. An intumescent coating composition comprising:
   (a) a polymeric binder;
   (b) an acid catalyst effective to form a phosphoric acid;
   (c) a solid carbon donor;
   (d) a liquid carbon donor in the form of one or more polyhydric alcohols effective to form a phosphoric, acid ester on contact with phosphoric acid wherein the phosphoric acid ester has a lower temperature of decomposition than the equivalent pentaerythritol phosphoric acid ester;
   (e) an expansion agent;
   (f) one or more pigments;
   (g) optionally, one or more other additives; and
   (h) a liquid carrier for the polymeric binder, wherein the liquid carrier comprises water or an organic solvent, and when the liquid carrier comprises water the binder and liquid carrier are in the form of an aqueous polymeric dispersion, and
   wherein the concentration of components (b), (e) and (f) in the coating composition is in the range 55-75% w/w solids; and
   wherein the ratio of (b):(d) is at least 6:1 w/w.

3. A dry coating composition coated onto a surface comprising:
   (a) a polymeric binder derived from either an aqueous polymeric dispersion of the binder or an organic solvent based solution of the binder;
   (b) an acid catalyst effective to form a phosphoric acid;
   (c) a solid carbon donor;
   (d) a liquid carbon donor in the form of one or more polyhydric alcohols effective to form a phosphoric acid ester on contact with phosphoric acid wherein the phosphoric acid ester has a lower temperature of decomposition than the equivalent pentaerythritol phosphoric acid ester;
   (e) an expansion agent;
   (f) one or more pigments; and
   (g) optionally, one or more other additives,
   wherein the ratio of combined components (b), (c), (e) and (f):(a) is 4:1 w/w to 8:1 w/w, and
   wherein the ratio of (b):(d) is at least 6:1 w/w.

4. A coated metal substrate wherein the coating comprises:—
   (a) a polymeric binder;
   (b) an acid catalyst effective to form a phosphoric acid;
   (c) a solid carbon donor;
   (d) a liquid carbon donor in the form of one or more polyhydric alcohols effective to form a phosphoric acid ester on contact with phosphoric acid wherein the phosphoric acid ester has a lower temperature of decomposition than the equivalent pentaerythritol phosphoric acid ester;
   (e) an expansion agent;
   (f) one or more pigments; and
   (g) optionally, one or more other additives,
   wherein the ratio of combined components (b), (c), (e) and (f):(a) is 4:1 w/w to 8:1 w/w, and
   wherein the ratio of (b):(d) is at least 6:1 w/w.

5. The intumescent coating composition according to claim 1, wherein the ratio of combined components (b), (c), (e) and (f):(a) is from 4:1 and 5:1 w/w.

6. The intumescent coating composition according to claim 1, wherein the ratio of (b):(c) is at least 3:1 w/w.

7. The intumescent coating composition according to claim 1, wherein the ratio of (e):(c) is at least 3:2 w/w.

8. The intumescent coating composition according to claim 1, wherein the ratio of (f):(c) is at least 2:1 w/w.

9. The intumescent coating composition according to claim 1, wherein the ratio of (e):(d) is at least 3:2 w/w.

10. The intumescent coating composition according to claim 1, wherein the ratio of (f):(d) is at least 2:1 w/w.

11. The intumescent coating composition according to claim 2, wherein the solid carbon donor (c) is present in the coating composition in the range 10-80% w/w total carbon donor.

12. The dry coating composition according to claim 3, wherein the liquid carbon donor (d) is present in the coating composition in the range 90 to 20% w/w total carbon donor (c) and (d).

13. The dry coating composition according to claim 3, wherein the liquid carbon donor is glycerine.

14. The intumescent coating composition according to claim 1, wherein the polymeric binder is vinyl acetate based.

15. The intumescent coating composition according to claim 14, wherein the polymeric binder is selected from a vinyl acetate-ethylene copolymer or a vinyl acetate-VeoVa copolymer.

16. The coated metal substrate according to claim 4, wherein the polymeric binder is derived from either an aqueous polymeric dispersion of the binder or an organic solvent based solution of the binder.

17. The intumescent coating composition according to claim 1, wherein the liquid carrier comprises xylene or a toluene-methylketone blend.

18. The intumescent coating composition according to claim 1, wherein the binder is present at 5-40% w/w solids.

19. The intumescent coating composition according to claim 1, wherein the solid carbon donor is an organic polyhydroxy compound.

20. The intumescent coating composition according to claim 19, wherein the solid carbon donor is selected from pentaerythritol, dipentaerythritol, tripentaerythritol, starch or sugars.

21. The intumescent coating composition according to claim 20, wherein the solid carbon donor is pentaerythritol.

22. The intumescent coating composition according to claim 1, wherein the expansion agent decomposes/is activated in the range 280 to 390° C.

23. The intumescent coating composition according to claim 1, wherein the expansion agent is a nitrogen containing compound.

24. The intumescent coating composition according to claim 23, wherein the expansion agent is selected from melamine, melamine salts, melamine derivatives, urea, dicyandiamide and guanidine.

25. The intumescent coating composition according to claim 24, wherein the expansion agent is melamine.

26. The intumescent coating composition according to claim 1, wherein the acid catalyst (b) is selected from phosphoric esters of polyhydroxy compounds, ammonium phosphates or amine phosphates.

27. The intumescent coating composition according to claim 26, wherein the acid catalyst (b) is ammonium polyphosphate (APP).

28. A method of fire protecting a substrate, comprising applying an intumescent coating composition according claim 1 to at least a portion of the substrate.

29. A method of fire protecting a substrate, comprising applying an intumescent coating composition according claim 2 to at least a portion of the substrate.

30. A method of fire protecting a substrate, comprising applying an intumescent coating composition according claim 3 to at least a portion of the substrate.

* * * * *